United States Patent [19]

Paseri

[11] Patent Number: 4,533,100

[45] Date of Patent: Aug. 6, 1985

[54] MOUNTING DEVICE FOR SUPPORTING A COMPONENT, ESPECIALLY A MIRROR OR AN ANTENNA REFLECTOR IN A SPACECRAFT

[75] Inventor: Jacques Paseri, Fontenay-les-Briis, France

[73] Assignees: R.E.O.S.C. (Recherches et Etudes d'Optique et de Sciences Connexes), Longjumeau; Societe Nationale Industrielle et Aerospatiale, Paris, both of France

[21] Appl. No.: 626,484

[22] Filed: Jul. 3, 1984

Related U.S. Application Data

[63] Continuation of Ser. No. 361,871, Mar. 25, 1982, abandoned.

[30] Foreign Application Priority Data

Apr. 3, 1981 [FR] France ................................ 81 06724

[51] Int. Cl.³ ................................................ B64G 1/66
[52] U.S. Cl. .............................. 244/158 R; 244/173; 343/DIG. 2; 308/2 A
[58] Field of Search ........................... 244/158 R, 173; 403/291, 57, 58; 248/485, 630, 183; 343/DIG. 2; 350/307; 308/2 A, 2 R; 267/160

[56] References Cited

U.S. PATENT DOCUMENTS

| | | | |
|---|---|---|---|
| 2,947,067 | 8/1960 | Vice et al. | 308/2 A |
| 3,240,454 | 3/1966 | Ormond | 308/2 A |
| 3,252,696 | 5/1966 | Friedel | 308/2 A |
| 3,465,997 | 9/1969 | Piske | 267/160 |
| 4,305,555 | 12/1981 | Davis | 244/173 |
| 4,382,709 | 5/1983 | Brown | 403/57 |

OTHER PUBLICATIONS

"LST Phase A Study", vol. III—Design Analysis and Trade Studies, Final Report, Jan. 8, 1973.

*Primary Examiner*—Trygve M. Blix
*Assistant Examiner*—Rodney Corl

[57] ABSTRACT

The invention relates to a mounting device for supporting a component, especially a mirror or an antenna reflector in a spacecraft. The device comprises a combination of flexible blades disposed between the support, and between the intermediate piece and the component.

11 Claims, 5 Drawing Figures

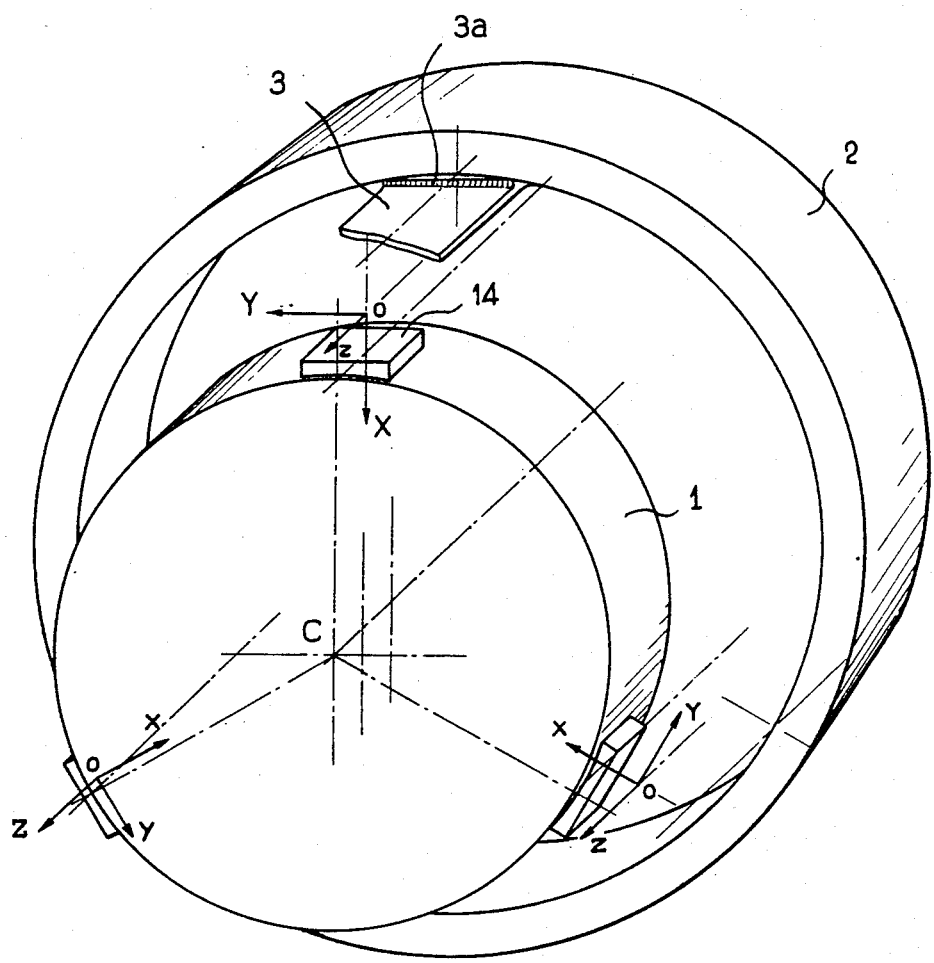
FIG_1

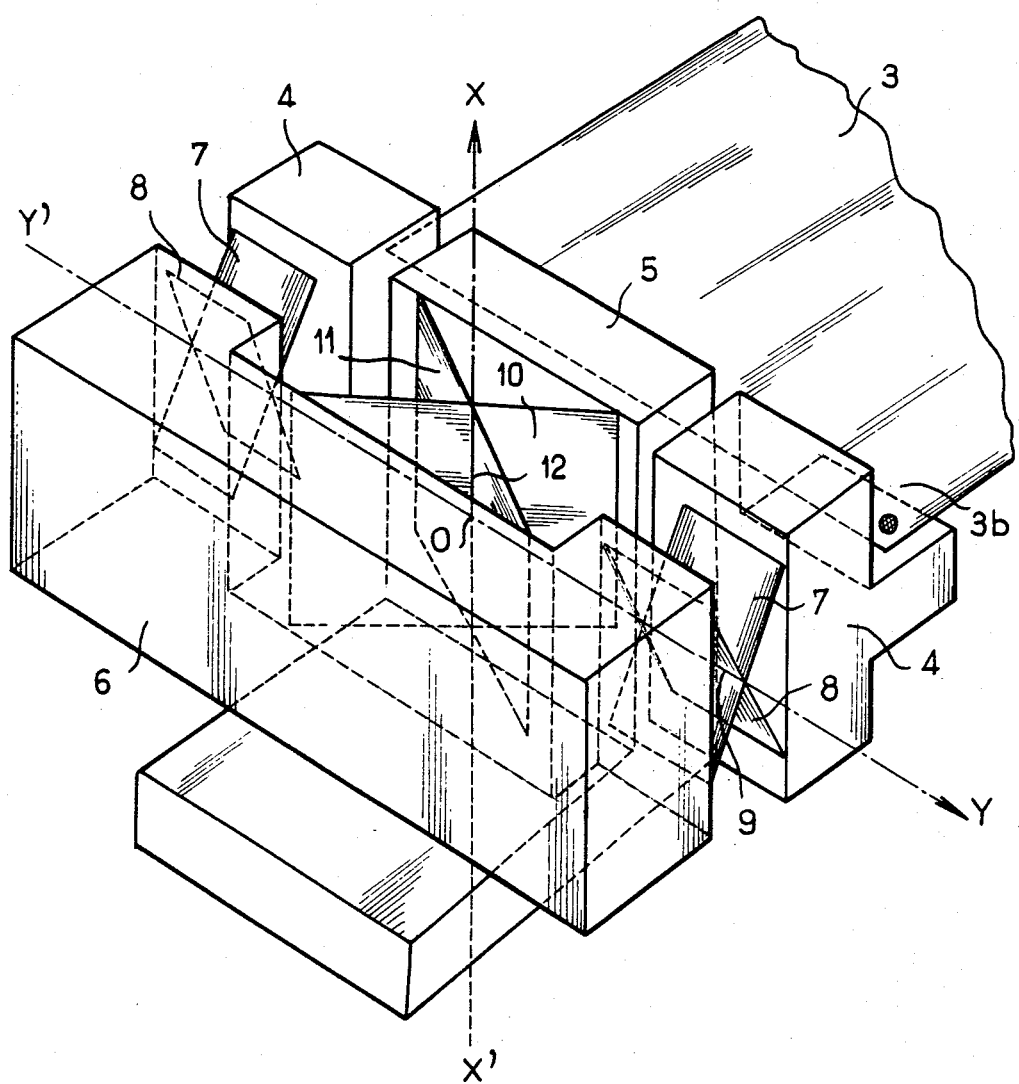
FIG_2

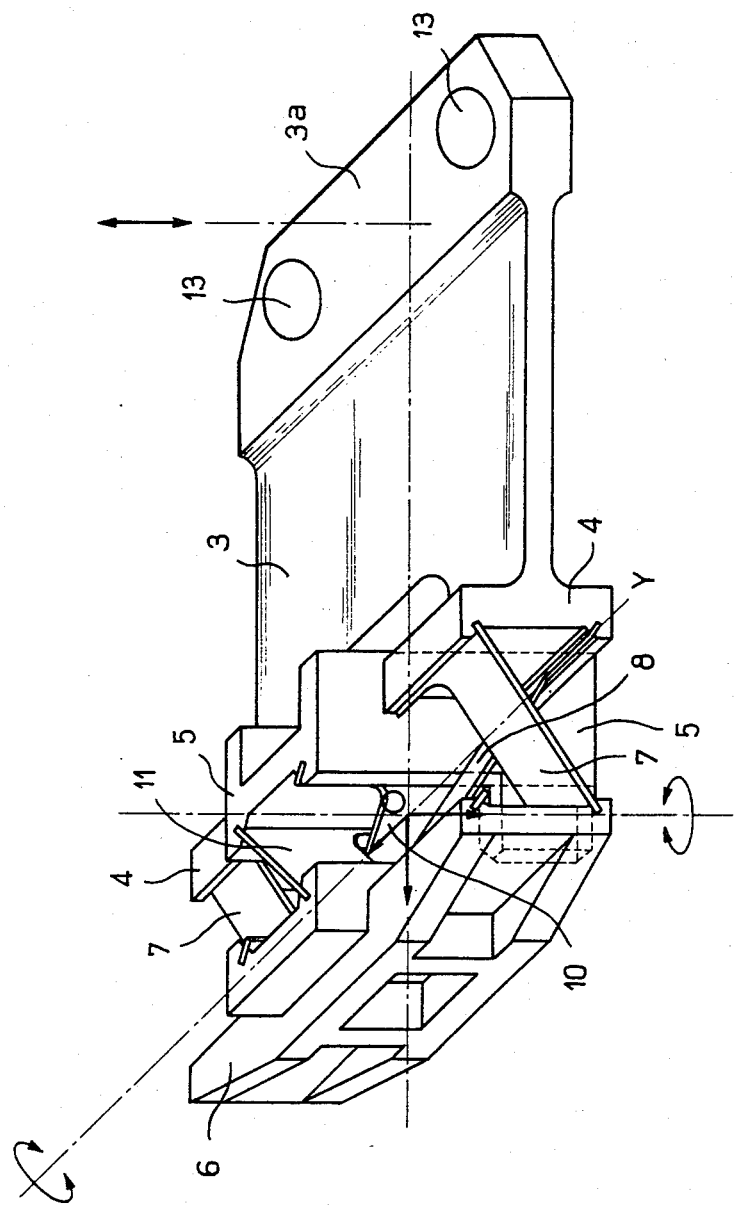
FIG_3

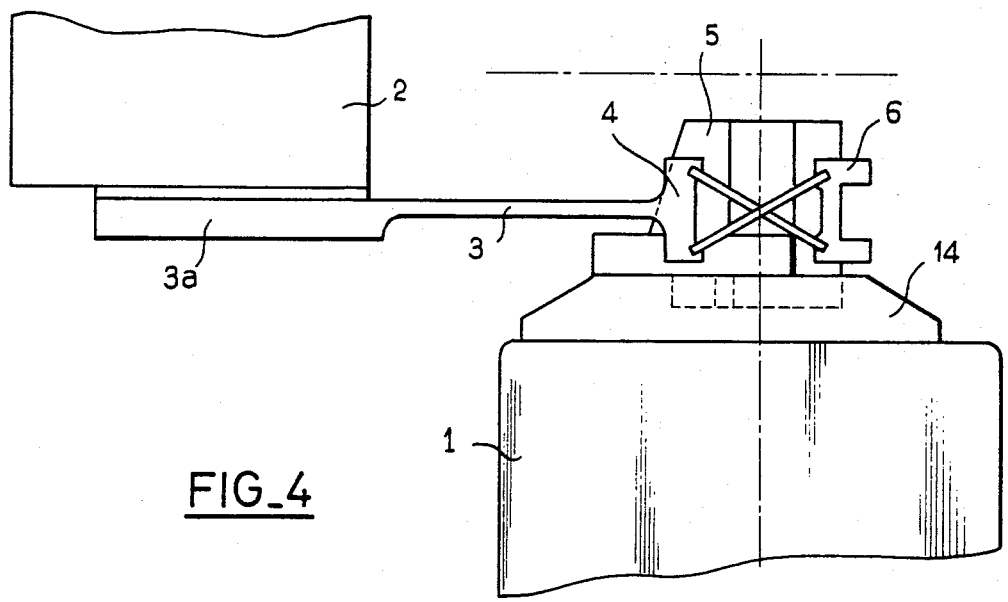
FIG_4
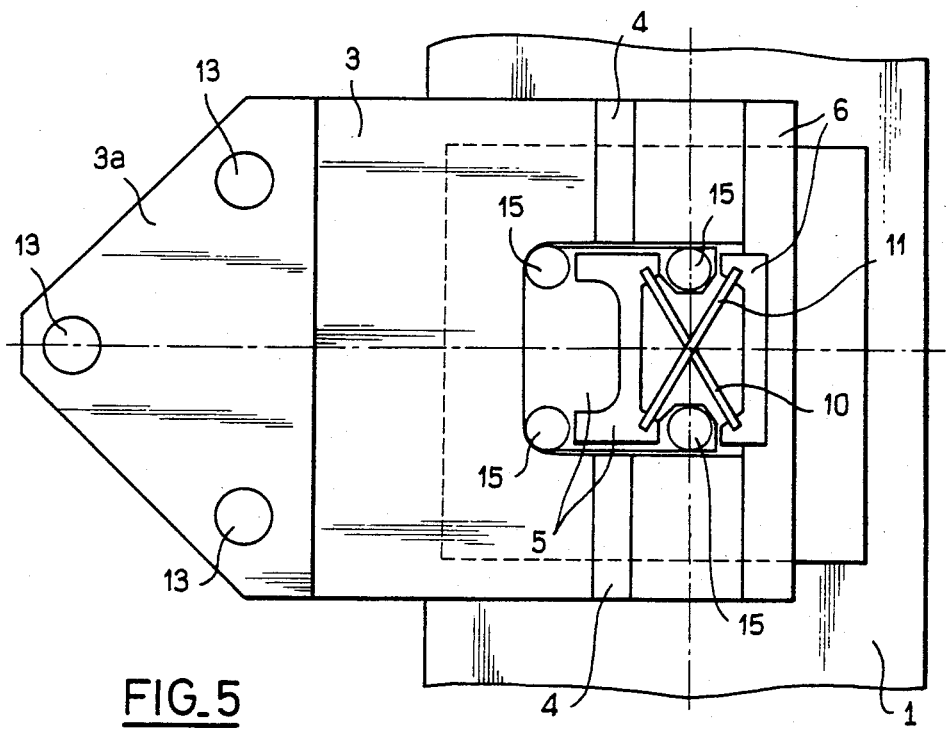
FIG_5

4,533,100

MOUNTING DEVICE FOR SUPPORTING A COMPONENT, ESPECIALLY A MIRROR OR AN ANTENNA REFLECTOR IN A SPACECRAFT

This application is a continuation of application Ser. No. 361,871, filed Mar. 25, 1982, now abandoned.

BACKGROUND OF THE INVENTION

The invention relates to a device for mounting a functional component in a support subjected to severe physical conditions (vibrations, temperatures, aging) capable of deforming the support, this deformation exerting on the supported component torques liable to deform the component and to compromise his function.

The invention relates especially to the mounting of an optical component and of an antenna reflector in a spacecraft.

By way of example, the mounting of a mirror (the primary mirror of a telescope), in a spacecraft will be described thereafter for explaining the invention.

Mounting devices for supporting an astronomical mirror in a spacecraft are known and exemplified for instance in the following publications.

SUPPORT AND TESTING OF LARGE ASTRONOMICAL MIRRORS (The University of Arizona and Kitt Peak National Observatory, July 1968);

STRUCTURAL DESIGN FOR LARGE SPACE TELESCOPES (NASA, A workshop held at Huntsville (Alabama) Apr. 29–May 1, 1969);

LST PHASE A STUDY, Vol. III "Design Analysis and Trade studies" (OPFI Optical Systems division of KOLLSMAN INSTRUMENT CORPORATION, Final Report, Jan. 8, 1973);

French Patent Publication No. 2,180,252 (November, 1973) and U.S. Pat. No. 3,832,040.

Mounting devices as known comprise ball and socket attachments alone or combined with flexible strips.

Such attachments either alone or combined, have drawbacks:

clearances in the transmissions, either by construction or under the effect of vibrations during the departure of the spacecraft;

aging difficult to expect;

jamming when the device works in space.

Consequently, the stability of the component is not secured and generally is not sufficient.

SUMMARY OF THE INVENTION

An object of the invention is to provide a mounting device for supporting a component in a support without ball and socket attachments in the transmissions between the support and the component.

Another object of the invention is to provide a mounting device for supporting a component in a support without clearance or friction in the transmissions between the support and the component.

Yet another object of the invention is to provide a mounting device for supporting a component in a support such that the torques transmitted to the component depend on the deformations of the support only and are lower than about 0.1 Newton.Meter.

The mounting device according to the invention for supporting a component in a support comprises:

a first flexible blade rigidly secured to the support and extending along a first axis towards the component;

a piece rigidly secured to the first blade and to which are fixed without clearance an end of each blade of a first pair of flexible blades, said blade of said first pair extending in two secant planes the intersection of which is parallel to a second axis;

a piece rigidly secured to the component and to which are fixed without clearance an end of each blade of a second pair of flexible blades, said blade of said other pair extending in two second secant planes the intersection of which is parallel to a third axes, said first, second and third axis being arranged according to the three directions of a triorthogonal system;

an intermediate piece to which are fixed without clearance the other ends of the blades of said first pair and of said second pair.

The component mounting system usually comprises several mounting devices of the type set forth, located at equally spaced points on a circle around the component.

Generally three devices spaced at 120° are used.

When the said component functions according to a principal axis (for instance, the optical axis of the mirror or the axis of the antenna reflector), said first axis is parallel to or orthogonal to said principal axis.

When the said component extends substantially in a surface, said first axis is perpendicular to this surface or said surface is parallel to the plane determined by said first axis and by one of said second and third axes.

The blades preferably cross each other at 60° or 90°.

The pieces to which are fixed the flexible blades are blocks preferably made of one or several prisms for facilitating the working thereof.

Flexible blades extend along planes and they are shaped at will.

When the planes cross, the shapes are designed to prevent the blades from colliding.

The invention will be best understood with reference to the following specification when taken in connection with the accompanying drawings.

BRIEF DESCRIPTION OF THE DRAWINGS

FIG. 1 is a fragmentary view of the mounting of a mirror in a support;

FIG. 2 illustrates schematically a mounting device according to the invention;

FIG. 3 is a view of an embodiment of the mounting device according to the invention;

FIG. 4 is a view of the mounting device in a plane perpendicular to the plane of the first flexible blade of the device, and FIG. 5 is a view of the mounting device according to FIG. 4 seen from above the first flexible blade.

DESCRIPTION OF THE PREFERRED EMBODIMENT

Referring to FIGS. 1 to 5, the component to be supported is an astronomic mirror 1 having its center in C and extending in a plane OX, OY, the optical axis of the mirror being parallel to OZ.

The mirror is mounted in an annular support 2 by means of three identical devices equally spaced on the periphery of the mirror. One of these devices will be described now.

The mounting device comprises a flexible plane blade 3 having one end 3a secured to the support 2, for instance by means of screws (the passages 13 of the screws are shown on FIGS. 3 and 5) and having the other end 3b rigidly fixed to two pieces 4 (FIG. 2), for instance two T-shaped pieces.

The blade 3 extends towards the rim of the mirror according to axis OZ.

A piece 5 located between pieces 4 is rigidly secured to the mirror. This piece 5 is L- or T-shaped preferably.

Pieces 4 and 5 have faces which are opposite to corresponding faces of a piece 6. Preferably the said faces are planes.

The opposite faces are connected by pairs of plane blades which cross each other and which are embedded, that is penetrate without clearance, in grooves of said faces and are fixed therein by welding or by gluing. The two crossed blades of each pair are located in two crossed planes, and in FIG. 2 it is the planes and not the blades which are shown.

Each piece 4 is connected to piece 6 by two flexible blades which extend in two crossed planes 7,8 having an intersection 9 along the axis Y'OY whereas pieces 5 and 6 are connected by two flexible blades which extend in two crossed planes 10,11 having an intersection 12 along the axis X'OX.

The flexible blades are thin elastic strips, blades having preferably a thickness of 1 to 3 mm.

By way of example:
Blade 3 (working by flexion): section $80 \times 2.5$ mm
Blades 10,11: section $25 \times 1.4$ mm
Blades 7,8: section $50 \times 1.2$ mm The length of the blades are for instance 15 to 30 mm (blades 7,8, 10,11) and 80 to 100 mm (blade 3). The depth of the embedding is about 1 mm for instance.

The blades preferably are steelblades.

Blades 10,11 are acting in case of a rotation around OX wherein blades 7,8 are acting in case of a rotation around OY.

In the embodiment shown in FIGS. 3 to 5, the two pieces 4 and the piece 3 are a single piece which has been worked to provide a thin portion constituting the flexible blade 3 and two thick portions constituting blocks 4.

The number of pairs of crossed flexible blades and the number of pieces 4,5,6 may vary according to various embodiments. For instance, in one embodiment, there are a single piece 4 between two pieces 5.

In the shown embodiments, flexible blade 3 is tangent to the mirror and parallel to the optical axis of the mirror. In another embodiment, the blade 3 is tangent to the mirror and orthogonal to the optical axis.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A device for mounting a component in a support, especially an optical element or an antenna reflector in a spacecraft, said device comprising:
    a first flexible plane blade rigidly secured to the support and extending along a first axis towards the component;
    a first piece rigidly secured to said first blade and to which are fixed without clearance an end of each blade of a first pair of flexible plane blades, said blades of said pair extending in two secant planes the intersection of which is parallel to a second axis;
    a second piece rigidly secured to said component and to which are fixed without clearance an end of each blade of a second pair of flexible plane blades, said blades of said second pair extending in two other secant planes the intersection of which is parallel to a third axis, said first, second and third axes being arranged according to the three directions of a triorthogonal system; and
    an intermediate piece to which are fixed without clearance the other ends of the blades of said first pair and of said second pair; whereby said component may translate in a plane containing said first and third axes and rotate about said second and third axes, with respect to said support.

2. A device according to claim 1, wherein the ends of the blades of said first pair and of said second pair are embedded in the pieces to which they are fixed.

3. A device according to claim 1 or 2, wherein said first piece and said second piece have faces opposite to said intermediate piece.

4. A device according to claim 1, wherein said second piece is located between two parts forming said first piece.

5. A device according to claim 1, wherein said first flexible blade and said first piece are different portions of a single piece.

6. A device according to claim 1 or 2, in combination with two other mounting devices which are identical with said device, the three devices being spaced at 120° on a circle around said component.

7. A device according to claim 1 wherein said component is an optical piece.

8. A device according to claim 7, wherein said optical piece is a mirror.

9. A device according to claim 7 wherein said optical piece has an optical axis which is parallel or orthogonal to said first axis.

10. A device according to claim 1 wherein said component is an antenna reflector.

11. A device according to claim 1 wherein said support is located in a spacecraft.

* * * * *